United States Patent [19]
Shepherd

[11] Patent Number: 5,544,819
[45] Date of Patent: Aug. 13, 1996

[54] ROTARY DISINTEGRATORS

[75] Inventor: Nigel R. C Shepherd, Nr. Goodrich, England

[73] Assignee: The Haigh Engineering Company Ltd., Ross-on-Wye, England

[21] Appl. No.: 255,184

[22] Filed: Jun. 7, 1994

[30]       Foreign Application Priority Data

Jun. 11, 1993 [GB] United Kingdom .................. 9312069
Nov. 29, 1993 [GB] United Kingdom .................. 9324497

[51] Int. Cl.⁶ .................................. B02C 7/00; B02C 7/11
[52] U.S. Cl. ........................................ 241/37; 241/261.2
[58] Field of Search ............................. 241/37, 86, 89.4, 241/261.2

[56]                References Cited

U.S. PATENT DOCUMENTS 3,848,814  11/1974  Syrjanen ..................................... 241/37
3,932,941   1/1976  Ormsby ..................................... 33/181 R
4,198,006   4/1980  Rolfe ............................................ 241/222
4,820,980   4/1989  Dodson-Edgars .................... 241/37 X
4,878,020  10/1989  Karna et al. ........................... 241/37 X

*Primary Examiner*—John Husar
*Attorney, Agent, or Firm*—Lahive & Cockfield

[57]                  ABSTRACT

A rotary disintegrator for liquid-borne solid waste, for example, has a cutter head (14) in which a rotatable headstock having cutting blades (28, 30) is urged by springs (38) against a shear plate (15). A signalling means for signalling predetermined wear of the shear plate (15) by the cutting blades (28, 30) includes a wear detector (65) having a rod electrode (67) mounted by an insulating plug (72) within a bore (74) in the shear plate (15). When the plug (72) is worn by the cutting blades to expose the electrode (67) the electrical circuit of the signalling means is completed thus providing an indication that a predetermined degree of wear of the shear plate (15) has occurred.

6 Claims, 2 Drawing Sheets

ROTARY DISINTEGRATORS

BACKGROUND OF THE INVENTION

The present invention comprises improvements in or relating to rotary disintegrators and concerns more particularly, although not exclusively, rotary disintegrators for liquid-borne solid waste, farm manure and other slurries of the type comprising a rotating spring loaded headstock which shears solids within holes in a stationary shear plate.

Wear takes place on both the shear plate and the headstock until a limit is reached, whereupon the cutters no longer achieve the desired disintegration of the solid waste.

Apart from periodic visual inspection, there is no means at present by which the point can be detected at which the cutters can be regarded as exhausted and in need of replacement.

An object of the present invention is to overcome this difficulty when using cutter heads in machines of the general kind.

SUMMARY OF THE INVENTION

According to the present invention there is provided a rotary disintegrator for liquid-borne solid waste, farm manure and other slurries comprising a cutter head having pair of relatively rotatable cutting parts having cutting edges lying in respective faces thereof and urged into contact with one another, face-to-face, and a signalling means for signalling predetermined wear of one of said faces comprising a wear detector fixed with respect thereto and arranged to detect when said predetermined amount of wear has occurred and activate the signalling means.

BRIEF DESCRIPTION OF THE DRAWINGS

Embodiments of the invention will now be described, by way of example only, with reference to the accompanying drawings of which

DESCRIPTION OF THE PREFERRED EMBODIMENTS

Figure 1:
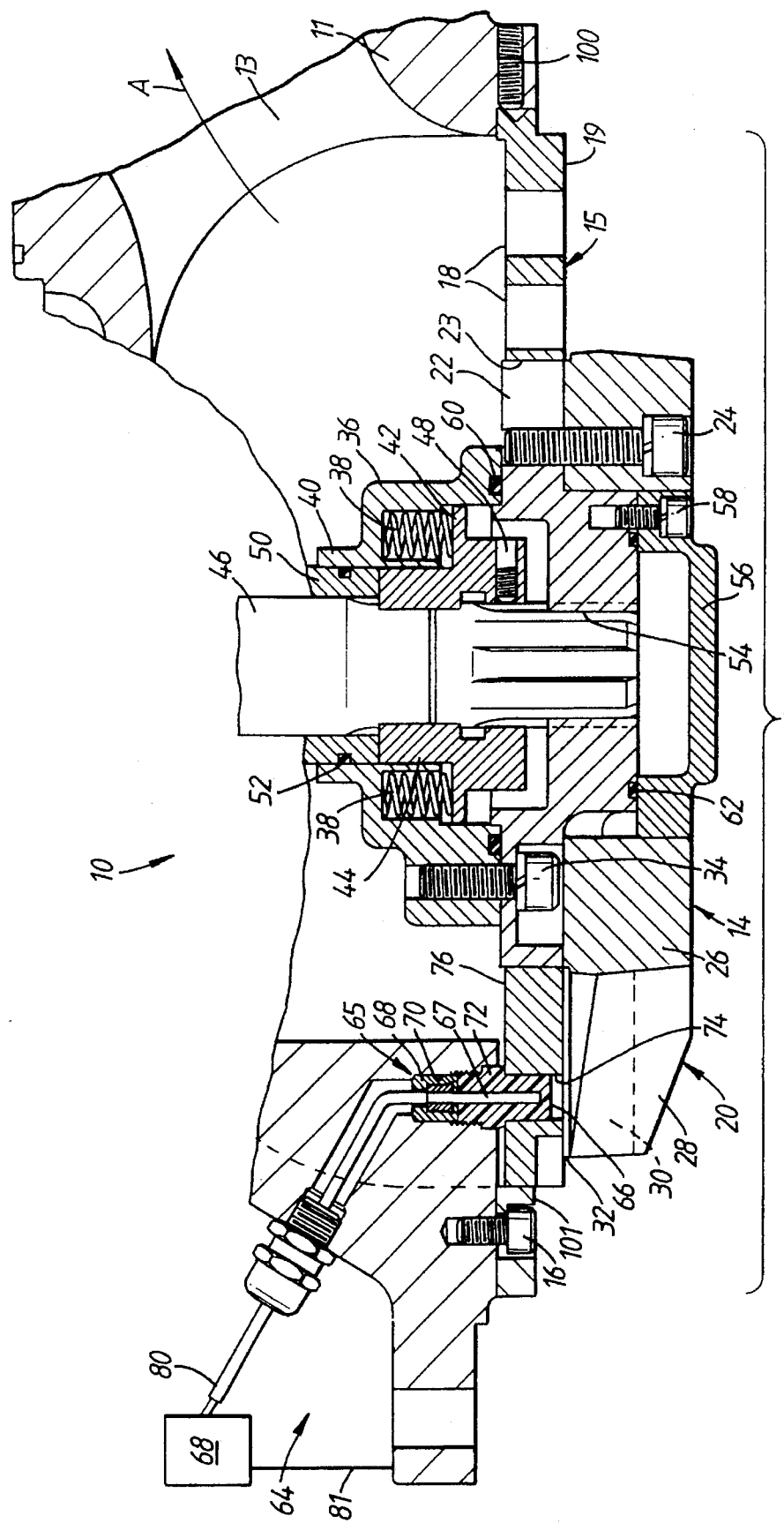
FIGS. 1 and 2 are cross-sectional views of a first and a second embodiment of the present invention.

With reference now to FIG. 1, a rotary disintegrator generally designated 10 comprises a cutter head housing 11 and having an inlet 12 for liquid containing solid waste e.g. sewerage waste. The cutter head, generally indicated at 14, comprises a replaceable shear plate 15 removably fixed in the housing 11 by screws 100 and located by a key 101 which is secured by screw 16. Liquid bearing solid waste entering the housing through the shear plate 15 from the headstock side 14 passes through holes such as 18 in the shear plate 15 in which the solids are sheared, at the lower face 19 in the drawing of the shear plate 15, by the rotating action of a headstock, generally indicated at 20, running in a central bore of the shear plate, the headstock comprising a hub 22 to which is removably and replacably fixed, by means of screws 24, a sub-assembly 26 of cutting blades 28 and 30 having cutting edges lying in a cutting face 32 of the headstock and shown as its upper face in the drawing. The headstock hub 22 is fixed, by screws 34, to a spring housing 36 which houses helically coiled compression springs 38 held loaded in compression in pockets of the housing between the inside of the housing upper wall 40 in the drawing and the upper face in the drawing of a nut flange 42 of a nut 44 carried towards the lower end in the drawing of a motorized, vertically disposed drive shaft 46 and secured against rotation with respect to the shaft by a set screw 48. The slurry exits at port 13 as indicated by arrow A.

The spring housing 36 is slidable at its upper end on a spacer sleeve 50 encircling the shaft 46, a Neoprene 0-ring seal 52 being provided between them to prevent the entry of liquid into the housing 36. The headstock hub 22 is drivably connected to the shaft 46 and is likewise slidably mounted with respect thereto by means of a splined drive connection 54 formed between the hub 22 and the lower end portion of the shaft 46. The drive shaft lower end face is covered by a cap 56 removably fixed to the hub 22 by screws 58 and Neoprene 0-ring seals 60, 62 complete the sealing of the interior of the housing 36.

With the construction so far described, the action of the springs 38 is to spring load the relatively rotatable cutting parts 15 and 20 of the cutter head 14 into contact with one another, face-to-face, the springs 38 urging the upper cutting face 32 of the headstock 20, in which the cutting edges of its cutting blades 28, 30 are disposed, against the lower face 19 of the shear plate 15 in order to ensure that solids are sheared in the holes 18 of the shear plate by the rotating action of the blades.

Due to the action of the springs 38, wear takes place on both the lower face of the shear plate 15 and on the upper face of the headstock 20, eventually needing their replacement.

In order to signal this need at the appropriate time, the present invention provides, in the embodiment now being described, a signalling means generally indicated at 64 and comprising a wear detector 65 fixed with respect to the lower face 19 of the shear plate 15 and having a face 66, presented as a hollow casing outside bottom end face in this instance, subject to wear and eventual breakthrough by the face 32 of the headstock 20 concurrently with wear of the lower face 19 of the shear plate 15, thereby to activate the signalling means 64 when the wear of the shear plate 15 reaches the point that the cutting action of the shear plate of the headstock may be regarded as exhausted and these parts in need of replacement.

The detector 65 comprises a detector probe in the form of a rod electrode 67, a spring loaded detector probe connector 68 mounted in a bore 70 in the housing 10 and engaging a shoulder 71 of the bore, and a wear plug formed as a hollow electrode casing 72 from an electrically insulating material such as a low density grade plastics material. The casing 72 is screw-threadedly engaged in an open end of said bore 70 and extends therefrom into a dedicated hole 74 in the shear plate 15 from the upper face 76 thereof.

The casing 72 slidably receives the electrode 67 which is urged by the spring loaded connector 68 against the bottom end wall of the casing 72 towards the inside of the face 66.

The signal means 64 further comprises an electrically operable alarm 68, such as a signal lamp, connected in circuit with a 12 or 24 V D.C. electrical power source (not shown), the electrode 67 via an electrical conductor 80, and the housing 10 via an electrical conductor 81.

So long as the outside bottom end face 66 of the electrode casing 72 remains intact, the signalling means 64 remains inactive.

When sufficient wear occurs on said bottom end face 66 to break through the face, the electrode 67 makes electrical contact with the rotating headstock and therefore the housing 10, and the lamp is energised to signal the need of replacement of the cutter parts.

The face 66 of the casing 72 is recessed in the dedicated hole 74 in the shear plate so that wear of the face 66 is delayed until a good portion of the life of the shear plate 15 has already been exhausted.

Figure 2:
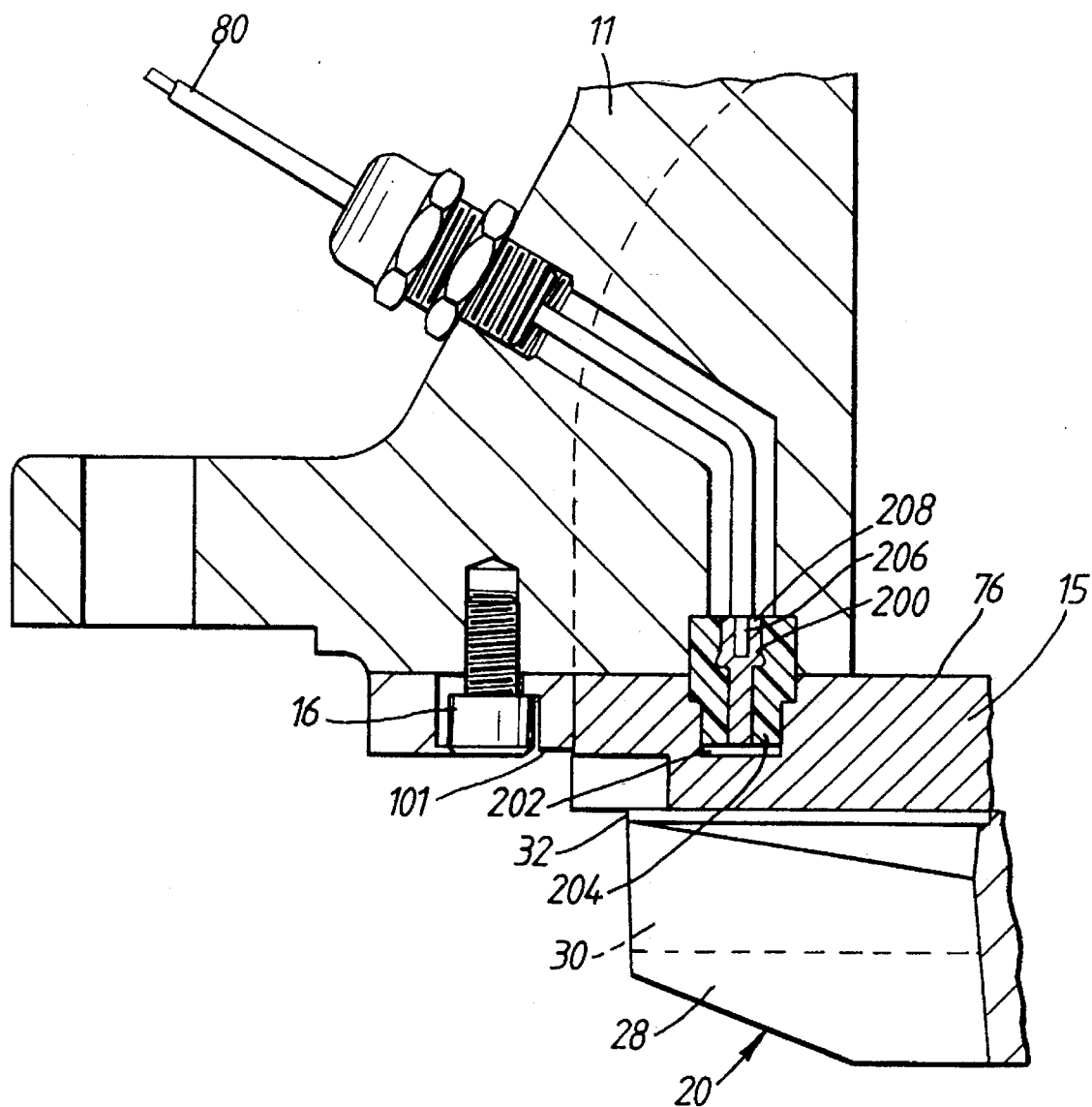

A preferred embodiment of the present invention is as shown in FIG. 2 except for the form of the wear detector and its mounting in the upper face 76 of the shear plate 15. The wear detector comprises an electrode 200, here of brass, mounted in a blind hole 202 in the shear plate 15 by means of an insulating plug 204. The electrode 200 is electrically connected to the electrical conductor 80 via a probe 206 and exposed to the blind hole 202. The conductor 80 is, as shown in FIG. 1, also connected to a signalling means.

Once the shear plate 15 has worn sufficiently the blind hole 202 will be exposed to slurry being fed to the disintegrator 10 and so electrically connect the electrode 200 to the shear plate 15. This completes the electrical circuit of the signalling means which indicates the predetermined degree of wear has taken place.

An advantage of this embodiment of the invention is that the signalling means can be triggered before the electrode 200 and insulating plug 204 are damaged by the cutting blades 28 and 30.

Should there be more wear of the faceplate 15 sufficient to reach the electrode 200 and insulating plug 204, a new assembly of electrode 200 and plug 204 can be inserted into the blind hole of replacement shear plate 15 to replace the damaged one on reassembly of the disintegrator.

The insulating plug 202 also acts as a seal between the shear plate 15 and the housing 11.

I claim:

1. A rotary disintegrator for liquid-borne solid waste, farm manure and other slurries comprising a cutter head having a pair of relatively rotatable cutting parts having cutting edges lying in respective faces thereof and urged into contact with one another, face-to-face, and a signalling means for signalling predetermined wear of one of said faces comprising a wear detector fixed with respect thereto and arranged to detect when said predetermined amount of wear has occurred and activate the signalling means, in which the wear detector comprises an electrode which is located so as to be electrically insulated from said one of the faces within a recess in the face until exposable to the slurry by wear of the face by the other of said faces.

2. A disintegrator as claimed in claim 1 in which the wear detector comprises an electrode retained within a blind hole in the face, which hole is exposed after said predetermined wear of the face.

3. A disintegrator as claimed in claim 2 in which the blind hole is in a shear plate and the electrode is retained in the blind hole by an insulating plug which also seals the shear plate to a housing in which the shear plate is mounted.

4. A rotary disintegrator as claimed in claim 3 in which one of said cutting parts is a shear plate defining apertures in which solids are sheared between the plate and the other cutting part and said wear detector is fixed with respect to the shear plate.

5. A rotary disintegrator as claimed in claim 2 in which one of said cutting parts is a shear plate defining apertures in which solids are sheared between the plate and the other cutting part and said wear detector is fixed with respect to the shear plate.

6. A rotary disintegrator as claimed in claim 1 in which one of said cutting parts is a shear plate defining apertures in which solids are sheared between the plate and the other cutting part and said wear detector is fixed with respect to the shear plate.

* * * * *